(12) United States Patent
Tarandek et al.

(10) Patent No.: US 11,649,866 B2
(45) Date of Patent: May 16, 2023

(54) FRICTION BRAKE SYSTEM FOR A VEHICLE

(71) Applicant: HL MANDO CORPORATION, Pyeongtaek-si (KR)

(72) Inventors: Kristijan Tarandek, Neu-Isenburg (DE); Hans-Jörg Feigel, Rosbach (DE)

(73) Assignee: HL MANDO CORPORATION, Pyeongtaek-si (KR)

( * ) Notice: Subject to any disclaimer, the term of this patent is extended or adjusted under 35 U.S.C. 154(b) by 130 days.

(21) Appl. No.: 17/221,031

(22) Filed: Apr. 2, 2021

(65) Prior Publication Data

US 2021/0310531 A1 Oct. 7, 2021

(30) Foreign Application Priority Data

Apr. 3, 2020 (DE) ...................... 10 2020 204 398.1

(51) Int. Cl.
| | | |
|---|---|---|
| *B60T 13/74* | (2006.01) | |
| *F16D 65/56* | (2006.01) | |
| *B60T 1/06* | (2006.01) | |
| *F16D 55/226* | (2006.01) | |
| *B60T 13/58* | (2006.01) | |
| *F16D 65/18* | (2006.01) | |
| *F16D 125/40* | (2012.01) | |
| *F16D 125/36* | (2012.01) | |

(Continued)

(52) U.S. Cl.
CPC ............ *F16D 65/567* (2013.01); *B60T 1/065* (2013.01); *B60T 13/58* (2013.01); *B60T 13/746* (2013.01); *F16D 55/226* (2013.01); *F16D 65/18* (2013.01); *B60T 2270/402* (2013.01); *F16D 2121/04* (2013.01); *F16D 2121/24* (2013.01); *F16D 2125/36* (2013.01); *F16D 2125/40* (2013.01)

(58) Field of Classification Search
CPC ...... F16D 65/567; F16D 55/226; F16D 65/18; F16D 2121/04; F16D 2121/24; F16D 2125/36; F16D 2125/40; B60T 1/065; B60T 13/58; B60T 13/741; B60T 13/746; B60T 2270/402
See application file for complete search history.

(56) References Cited

U.S. PATENT DOCUMENTS 3,991,859 A * 11/1976 Coulter ................... F16D 65/18
188/71.9
5,123,505 A * 6/1992 Antony ................ F16D 65/567
188/71.9

(Continued)

*Primary Examiner* — Nicholas J Lane
(74) *Attorney, Agent, or Firm* — Hauptman Ham, LLP (57) ABSTRACT

A friction brake system comprises a first gear unit having a first member and a second member, the first gear unit is configured for converting a rotary motion of the first member into a braking motion of the second member, the first member is configured such that the rotary motion may be driven by an electric motor, the brake system further comprises a second gear unit having a spindle and nut for converting a rotary motion into a linear motion for pad wear compensation, the spindle is connectable to a brake pad, the second member of the first gear unit and the nut of the second gear unit are or may be mechanically coupled such that, during the braking motion, the second member of the first gear unit pushes against the nut of the second gear unit to press the brake pad against a friction surface.

11 Claims, 6 Drawing Sheets

(51) Int. Cl.
*F16D 121/04* (2012.01)
*F16D 121/24* (2012.01)

(56) References Cited

U.S. PATENT DOCUMENTS

| | | | |
|---|---|---|---|
| 6,311,807 B1* | 11/2001 | Rinsma | F16D 65/567 |
| | | | 188/71.9 |
| 2014/0159473 A1 | 6/2014 | Kuhlman | |
| 2015/0316933 A1* | 11/2015 | Masuda | G05D 3/12 |
| | | | 310/68 B |
| 2016/0355169 A1* | 12/2016 | Ohlig | B60T 13/741 |
| 2018/0087590 A1* | 3/2018 | Chelaidite | F16D 55/226 |
| 2020/0049215 A1* | 2/2020 | Song | B60T 8/17 |
| 2021/0301889 A1* | 9/2021 | Gerber | B60T 13/746 |
| 2021/0301892 A1* | 9/2021 | Gerber | F16D 65/18 |
| 2022/0024434 A1* | 1/2022 | Baek | F16D 55/226 |

\* cited by examiner

FRICTION BRAKE SYSTEM FOR A VEHICLE

CROSS-REFERENCE TO RELATED APPLICATION(S)

This application is based on and claims priority under 35 U.S.C. § 119 to German Patent Application No. 10 2020 204 398.1, filed on Apr. 3, 2020, the disclosure of which is incorporated herein by reference.

BACKGROUND

The present application relates to a friction brake system for a vehicle. In particular, the present application relates to a friction brake system having a gear unit for converting a rotary motion into a braking motion and a gear unit for converting a rotary motion into a linear motion for pad wear compensation.

Various friction brake systems for vehicles are known. For example, motor vehicle brake systems, such as brake-by-wire systems, may comprise a master cylinder and piston arrangement which may be actuated by a brake pedal to compress hydraulic fluid. A pedal travel sensor may be coupled to the brake pedal to detect an amount of travel of the brake pedal. The corresponding signal may be sent to a controller, which may control a pressure supplying device based on the amount of travel of the brake pedal. The pressure supplying device is hydraulically coupled with the wheel brakes. Further, a pedal feel simulator coupled with one of the master cylinder outputs may be provided to mimic the feel of a hydraulic coupling between the brake pedal and the wheel brakes. In addition, as a fallback mode, the master cylinder may be in communication with the wheel brakes directly in case of failure, so that an actuation of the brake pedal causes braking directly. Related prior art is described, e.g., in document US 2014/0159473 A1. Other friction brake systems may comprise an electric motor for actuating the wheel brakes during normal operation. These systems of may have a gear unit for converting a rotary motion generated by the electric motor into a braking motion in which a brake pad is pushed against a brake disc. In addition, a friction brake system may comprise a mechanism for pad wear compensation. However, especially for front wheels that are typically used for steering the vehicle, packaging of a brake caliper may be more challenging than for rear wheels, as interference with other components is more difficult to avoid.

SUMMARY

In view of the above-mentioned aspects, it is an object of the present application to provide an improved friction brake system for a vehicle. The proposed friction brake system is intended to ensure reliable operation and to be particularly suitable for installation in challenging spaces, in particular when used with front wheels of vehicles.

This objective is achieved by a friction brake system having the features of independent claim 1. Optional further features and further developments will become apparent from the dependent claims and the detailed description in conjunction with the accompanying figures.

The proposed friction brake system for a vehicle comprises a first gear unit having a first member and a second member. The first gear unit is configured for converting a rotary motion of the first member into a braking motion of the second member. Further, the first member is configured such that the rotary motion may be driven by an electric motor. The brake system further comprises a second gear unit having a spindle and nut for converting a rotary motion into a linear motion for pad wear compensation. The spindle is connectable to a brake pad. The second member of the first gear unit and the nut of the second gear unit are or may be mechanically coupled such that, during the braking motion, the second member of the first gear unit pushes against the nut of the second gear unit to press the brake pad against a friction surface. Further, the first gear unit and the second gear unit are or may be arranged such that the second gear unit penetrates the first gear unit at least partially, in particular fully.

The proposed friction brake system allows reliable braking operation while being particularly robust and very compact. Therefore, the proposed friction brake system is particularly suitable for installation in challenging spaces where an undesired interference with other vehicle components, e.g., with a drive shaft of the vehicle, may occur. One particularly suitable use of the proposed friction brake system is for front wheels of a vehicle, as the space for installation may be particularly limited due to a steering mechanism coupled with the front wheels. Hence, an electromagnetic brake system coupled to a front wheel typically requires short actuators, which makes the proposed friction brake system particularly suitable.

The braking motion of the second member of the first gear unit is typically a linear motion. The braking motion may be the motion that enables braking during normal operation, e.g., in a brake-by-wire mode of operation. The first gear unit is typically configured to enable a normal brake function, while the second gear unit is configured for pad wear compensation. The proposed friction brake system enables separate braking and pad wear compensation operation having independent stroke lengths. Typically, a stroke enabled by the first gear unit is smaller than a stroke enabled by the second gear unit. For example, the stroke enabled by the first gear unit may be at least 1 mm and/or at most 4 mm, for example 2 mm. The stroke enable by the second gear unit may be at least 10 mm and/or at most 40 mm, for example 20 mm. Typically, the nut and the spindle of the second gear unit are arranged coaxially with respect to the first gear unit.

Typically, a very compact arrangement is achieved when the nut of the second gear unit has an axial overlap with the second gear unit, in particular with the first member and/or with the second member of the second gear unit. In typical embodiments, the nut of the second gear unit is connected to the spindle of the second gear unit via a threaded surface of the nut. For a particularly compact arrangement, the threaded surface of the nut may have an axial overlap with the first gear unit. An axial direction typically corresponds to a direction of the braking motion of the second member and/or of the linear motion for pad wear compensation.

The second member of the first gear unit and the nut of the second gear unit may be rotatably coupled, in particular such that the nut of the second gear unit is allowed to rotate with respect to the second member of the first gear unit during pad wear compensation. In this way, the compact arrangement of the proposed friction brake system enables efficient and reliable pad wear compensation.

The first gear unit may comprise at least one ball arranged and retained between the first member of the first gear unit and the second member of the first gear unit. The ball may be configured to convert a rotary motion of the first member into the braking motion of the second member. In this way, the first gear unit constitutes a high efficiency linear gear. Most embodiments comprise more than one ball arranged and retained between the first member of the first gear unit and the second member of the first gear unit to convert a rotary motion of the first member into the braking motion of the second member. For example, the first gear unit may comprise at least three, in particular at least four or more than four, balls for an efficient conversion and a stable and robust arrangement.

For a particularly compact and robust arrangement, the ball, in particular all of the balls, of the first gear unit may have an axial overlap with the second gear unit, in particular with the threaded surface of the nut of the second gear unit. Typically, the second gear unit has a longer axial extension than the first gear unit. In most embodiments, all of the components of the first gear unit overlap with the second gear unit axially. Typically, the second gear unit extends beyond the first gear unit at a first axial end of the first gear unit and/or at a second axial end of the first gear unit opposite the first axial end of the first gear unit.

In some particularly robust embodiments, the first member and the second member of the first gear unit may be axially spaced from one another, in particular such that the first member and the second member do not have an axial overlap. Typically, the at least one ball, in particular each ball, of the first gear unit has an radial overlap, i.e., the components are arranged at a common radial position in different axial positions, with the first member and with the second member.

For example, the first gear unit may be a ball in ramp gear. In this embodiment, the first member may be a first plate with at least one groove. The second member is a second plate with at least one groove facing the groove of the first plate. The at least one ball may be arranged between the first plate and the second plate. The ball may be retained by the groove of the first plate and the groove of the second plate. The ball in ramp gear may be configured to convert a rotary motion of the first plate into a translational motion of the second plate with respect to the first plate. In this manner, the braking motion may be achieved. The embodiment of a ball in ramp gear has the advantage of being robust and comparably low in cost.

In some embodiments, the first gear unit has a travel dependent gear ratio in such a way that a travel distance corresponding to the braking motion is longer for a given rotation angle of the rotary motion when the brake pad is further away from the friction surface as compared to when the brake pad is in contact with the friction surface. Typically, after the brake pad has travelled a particular distance, and in particular after contact of the brake pad with the friction surface has been made, the particular angular momentum is converted into a smaller relative travel distance of the brake pad. This may, e.g., be achieved by choosing a non-linear profile of the grooves of the first plate and of the second plate, if the first gear unit is the ball in ramp gear. In this way, a low gear ratio at ramp start may be achieved by the proposed friction brake system. Further, a sufficiently high clamping force can be obtained in a short time with a lower motor power. Therefore, the embodiment enables cost reduction, because a smaller electric drive may be necessary.

In some particularly compact embodiments, the first member of the first gear unit and the second member of the first gear unit have an axial overlap. Typically, the at least one ball, in particular each ball, of the first gear unit has an axial overlap, i.e., the components are arranged at a common axial position in different radial positions, with the first member and with the second member. For example, the first gear unit may be a ball screw. In this case, the first member may be a ball screw nut. Further, the second member may be a ball screw shaft. The ball screw shaft may be surrounded by the ball screw nut. The ball screw shaft may surround the nut of the second gear unit. Further, the nut of the second gear unit may surround the spindle of the second gear unit. Typically, the ball screw nut, the ball screw shaft, the nut of the second gear unit, and the spindle of the second gear unit are arranged coaxially.

The friction brake system may comprise a brake caliper arrangement. The brake caliper arrangement may be configured to press another brake pad against a surface opposite the friction surface during the braking motion. Typically, the friction surface is a surface of a brake disk. The caliper arrangement typically enables a force being applied to the brake disk from both sides, when the braking motion is performed, e.g., due to a brake signal sent to the electric motor leading to the electric motor rotating the first member of the first gear unit.

The friction brake system may further comprise a hydraulic chamber. In addition, the friction brake system may comprise a piston arranged between the hydraulic chamber and the first gear unit and/or the second gear unit. The piston may be configured to push the first gear unit and/or the second gear unit toward the friction surface upon pressurization of the hydraulic chamber to press the brake pad against the friction surface in a hydraulic fallback mode. The hydraulic chamber typically has a direct or an indirect fluid connection with a brake cylinder. In case of malfunction or failure of the electromagnetic brake, a fluid pressure may be generated in the brake cylinder using a brake pedal. This fluid pressure may be transferred to the hydraulic chamber of the friction brake system to enable emergency braking in a fallback mode. Typically, when the piston pushes the first gear unit and/or the second gear unit toward the friction surface, the piston and the first gear unit and/or second gear unit move the axial direction. In most embodiments, the piston is configured to directly or indirectly, e.g., via the first gear unit, push against the nut of the second gear unit. In particular, the piston may be configured to push against the first member of the first gear unit. In some embodiments, a bearing, in particular a roller bearing, is arranged between the piston and the first member of the first gear unit to enable rotation of the first member with respect to the piston, when the rotary motion of the first member is driven by the electric motor.

To further achieve a compact arrangement, the first gear unit may be arranged such that the second member is closer to the brake pad than the first member, in particular when the braking motion is applied by the electric motor.

The proposed friction brake system may also comprise the electric motor. The electric motor may be mechanically coupled to the first member of the first gear unit to drive the rotary motion of the first member of the first gear unit. In particular, the electric motor may be mechanically coupled to the first member of the first gear unit via a belt drive.

In typical embodiments, the first member and/or the second member and/or the nut of the second gear unit and/or the spindle of the second gear unit are formed as one-piece parts to enable a robust arrangement and easy assembly. Typically, the spindle of the second gear unit and/or the second member of the first gear unit is/are not rotatable.

BRIEF DESCRIPTION OF THE DRAWINGS

Exemplary embodiments will be described in conjunction with the following figures.

DETAILED DESCRIPTION

Figure 1:
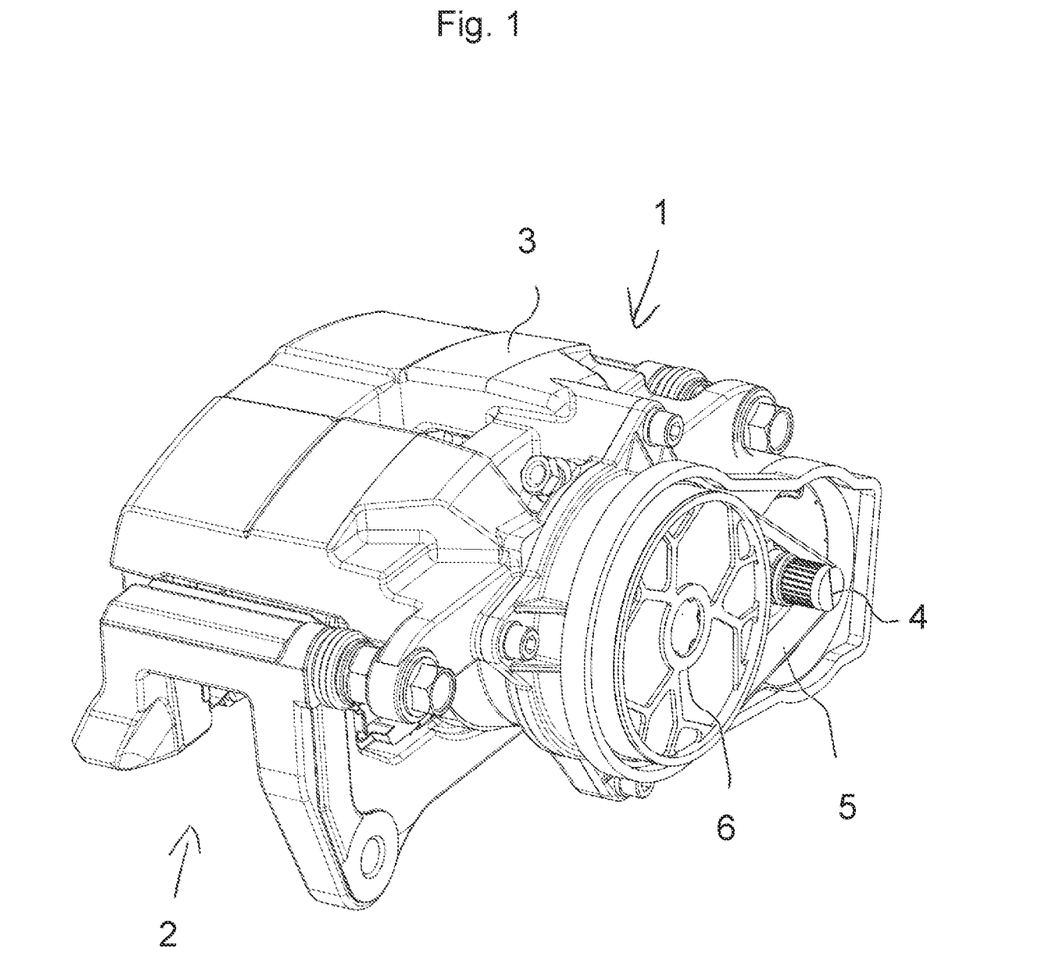
FIG. 1 shows a perspective view of a friction brake system for a vehicle.

FIG. 1 shows a friction brake system 1 for a vehicle. The friction brake system 1 comprises a brake caliper arrangement 2 having two brake pads configured to press against a brake disk of a wheel of the vehicle for braking the vehicle. The system 1 further comprises a housing 3. A part of the housing 3 for covering an electric motor of the system 1 is not shown in this figure to facilitate view of a motor shaft 4. The electric motor forms a part of an electro-mechanical actuator, which can press and release the brake pads to and from the brake disk. The motor shaft 4 is connected to a belt 5 for driving a rotation of a rotary connector 6. As it is explained below, the rotary connector 6 is connected to a first gear unit, more precisely to a first member of the first gear unit, for converting the rotational motion generated by the electric motor into a linear braking motion for pressing the brake pads from opposing sides against the brake disk of the wheel.

Figure 2:
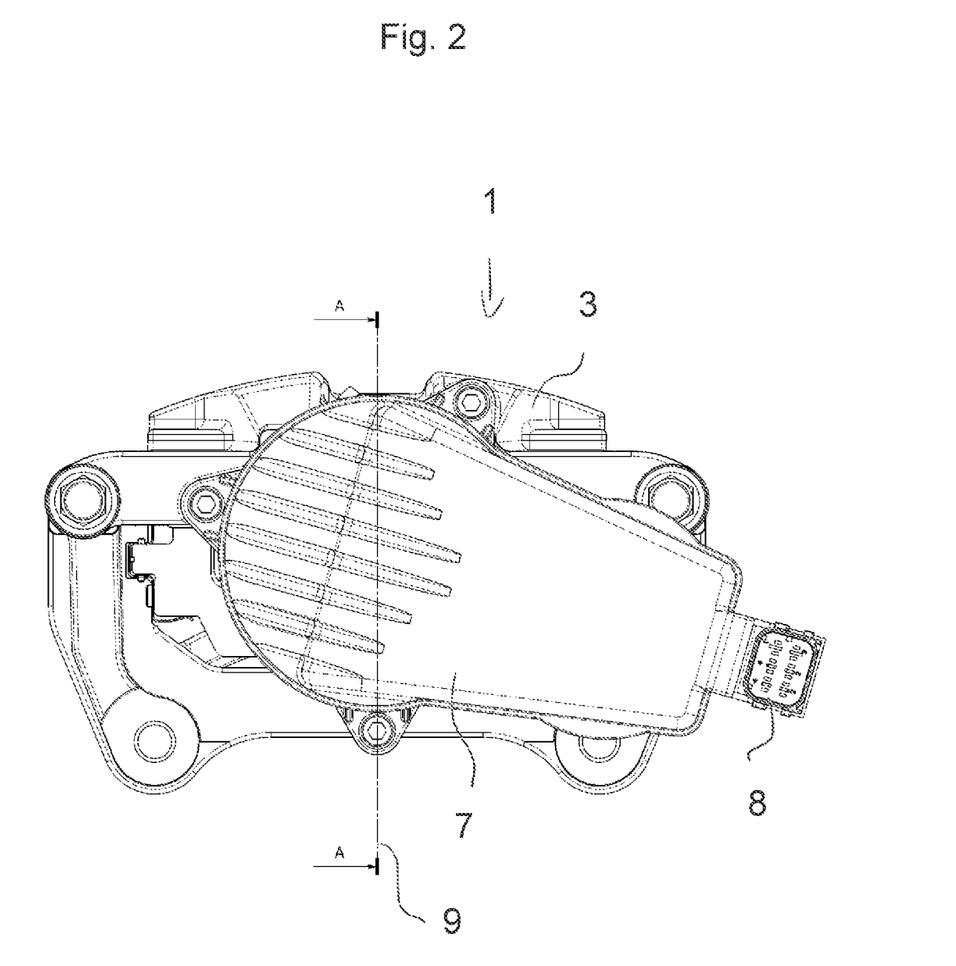
FIG. 2 shows a side view of the friction brake system.

FIG. 2 shows the friction brake system 1 in a side view. Corresponding and reoccurring features shown in the different figures are denoted using the same reference numerals. The part 7 of the housing covering the electric motor and the belt 5 is shown in this figure. In addition, a connector 8 for electrically connecting the system 1 to a vehicle control unit and power source is shown. A line with reference sign 9 indicates a cross-sectional plane used for FIGS. 4, 5, and 6 below.

Figure 3:
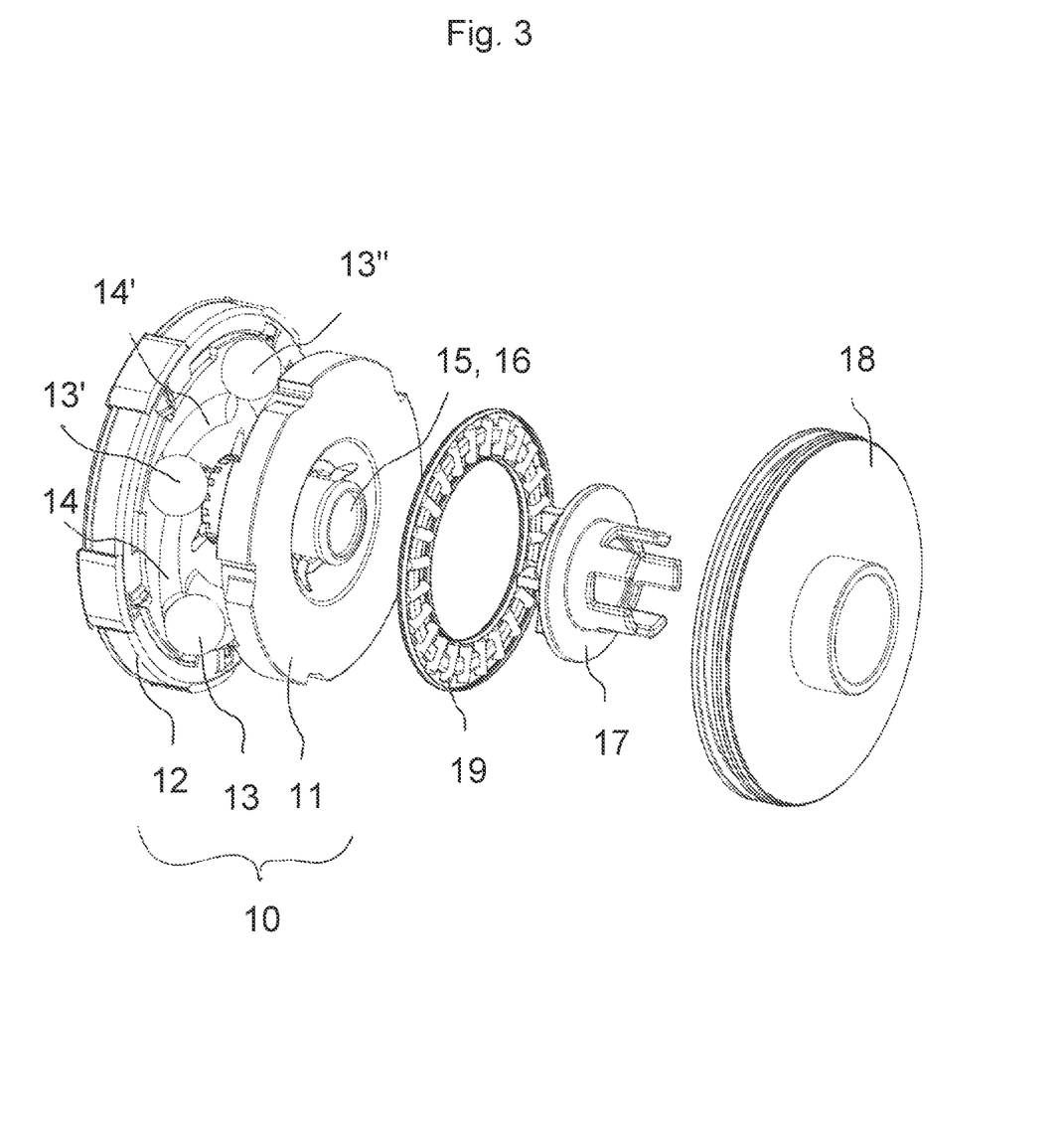
FIG. 3 shows an exploded view of components of the friction brake system including a ball in ramp gear.

FIG. 3 shows an exploded view of components of the friction brake system 1. The friction brake system 1, according to the embodiment shown, comprises a ball in ramp gear 10 as the first gear unit. The first gear unit has a first plate 11 as the first member, a second plate 12 as the second member and a set of balls 13, 13', 13'' arranged between the first plate 11 and the second plate 12. The balls 13, 13', 13'' are each retained by a pair of grooves in inner surfaces of the first plate 11 and the second plate 12. While the grooves 14, 14' of the second plate 12 are shown, the first plate 11 comprises corresponding grooves that are not visible in the figure. The balls and corresponding grooves are shaped such that the ball in ramp gear 10 converts a rotary motion of the first plate 11 driven by the electric motor into a translational motion of the second plate 12 for pressing the brake pads against the brake disk. In some embodiments, the grooves 14, 14' are shaped such that the first gear unit 10 has a travel dependent gear ratio in such a way that a travel distance is longer for a given rotation angle of the motor shaft 4 when the plates 11, 12 are closer together. To allow smooth rotation of the first plate 11, the first plate 11 rests against a piston 18 via a roller bearing 19. A part 17 of the rotary connector 6 transmits the rotary motion from the motor shaft 4 to the first plate 11 of the first gear unit. The plates 11, 12 and balls 13, 13', 13'' of the ball in ramp gear 10 surround a second gear unit 15 for pad war compensation. The second gear unit 15 has a nut 16. The second gear unit 15 is arranged radially closer to a main axis of the system 1 as compared with the first gear unit 10. A spring may be arranged between the first plate 11 and the second plate 12 to ensure that in case of a failure the caliper arrangement 2 is releasing fast. The first and second gear units may be arranged in parallel and may have a common main axis.

Figure 4:
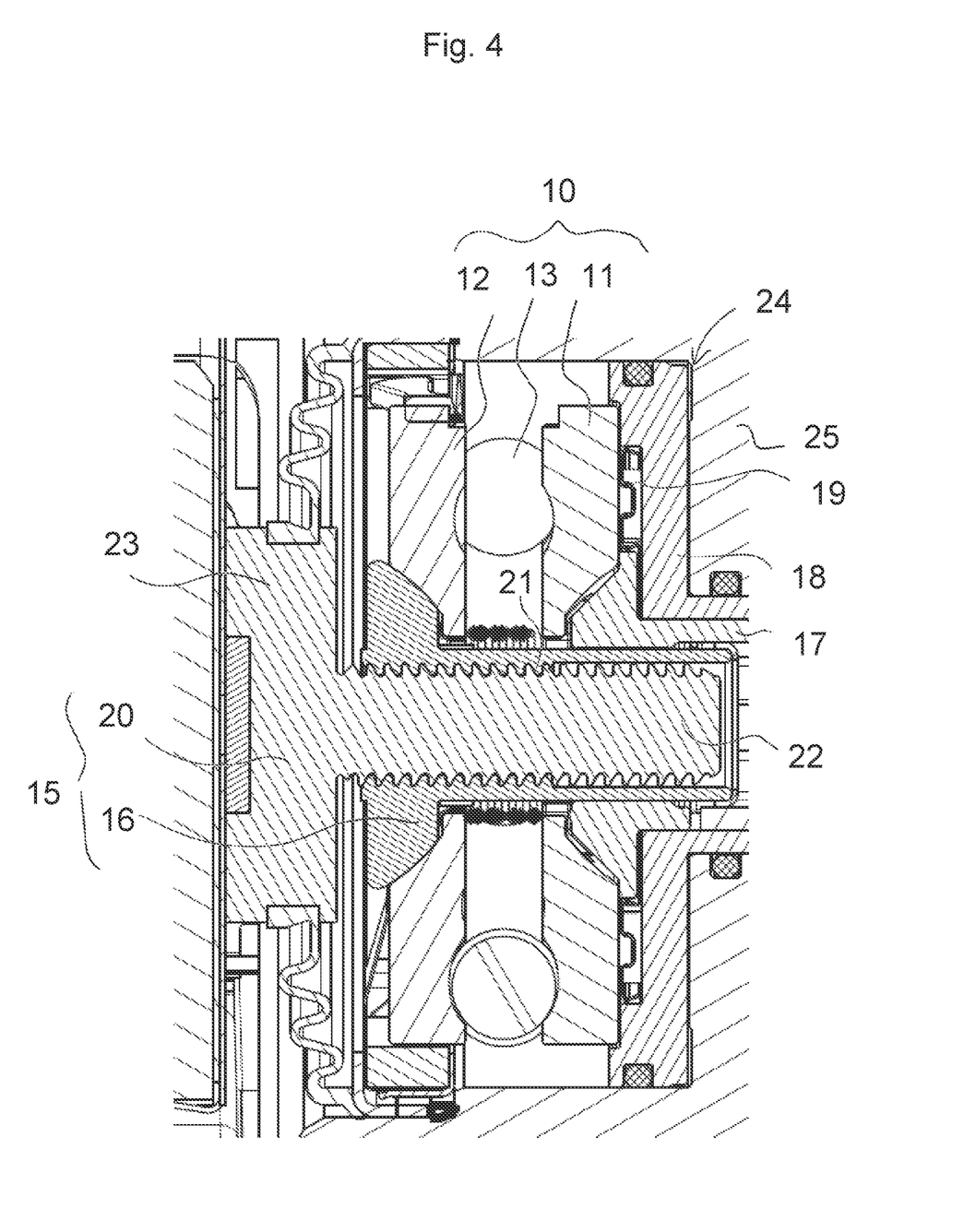
FIG. 4 shows a cross-sectional view of a first gear unit and a second gear unit of the friction brake system.

FIG. 4 is a cross-sectional view showing the first gear unit 10 and the second gear unit 15 in detail. As shown, the second gear unit 15 is arranged within the first gear unit 10 such that the second gear unit 15 penetrates the first gear unit 10. The second gear unit 15 comprises the nut 16 and a spindle 20. The nut 16 and spindle 20 comprise complementary threaded surfaces 21 such that the spindle 20 may be rotated with respect to the nut 16 to compensate pad wear. The spindle 20 has a threaded portion 22 to be received within the nut 16 and a widened portion 23 arranged closer to the brake disk. The brake pad is attached to the widened portion 23 such that it is arranged between the spindle 20 and the brake disk.

When the brake is applied using the electric motor, the rotation of the first plate 11 leads to a translation of the second plate 12 to the left. The second plate 12 may be fixed with regard to rotational motion and movably held with respect to linear motion. When the second plate 12 moves to the left it pushes the nut 16 of the second gear unit 15 to the left, so that the spindle 20 moves to the left together with the brake pad to perform the braking motion. The nut 16 of the second gear unit 15 is rotatable with respect to the second plate 12 to allow for pad wear adjustment. To compensate for pad wear, the nut 16 may be rotated, so that the spindle 20 moves to the left. The nut 15 may, e.g., be connected to the second plate 12 via a ratchet mechanism.

The system 1 also has a small hydraulic chamber 24 arranged between the piston 18 and an end plane part 25 of the housing. When the hydraulic chamber is not pressurized, as shown in the figure, the piston 18 may be in contact with the end plane part 25 of the housing. The hydraulic chamber 24 is fluidly connected with a brake cylinder and may be pressurized by actuating a brake pedal in a fallback mode of operation. When the hydraulic chamber 24 is pressurized, hydraulic fluid within the hydraulic chamber forces the roller bearing 19, the part 17 of the rotary connector 6, the first gear unit 10, and the second gear unit 15 to the left, so that the brake pad is pushed against the brake disk. A spring may be provided to directly or indirectly push back the piston after a hydraulic braking operation has been performed.

Figure 5:
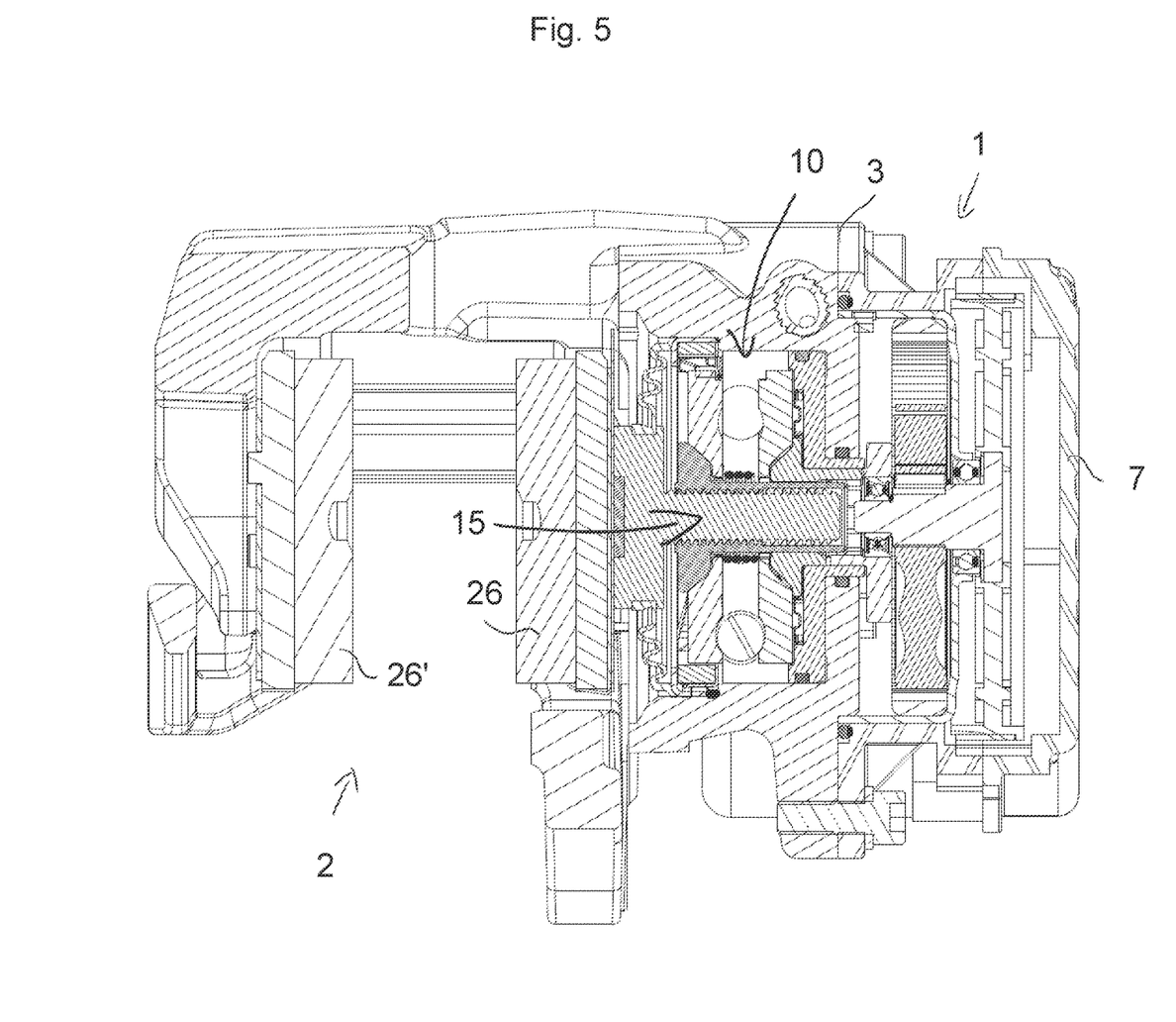
FIG. 5 shows a cross-sectional view of the friction gear unit.

FIG. 5 shows the friction brake system 1 in less detail. As can be seen, the brake caliper arrangement 2 comprises a set of brake pad holders 26, 26' configured to hold the brake pads. When the braking motion is performed, the brake pad holders 26, 26' move inward together with the brake pads so that a force is applied to the brake disk (not shown) from opposing sides. As can be seen, the arrangement shown is particularly compact, because the second gear unit 15 is received within the first gear unit 10.

Figure 6:
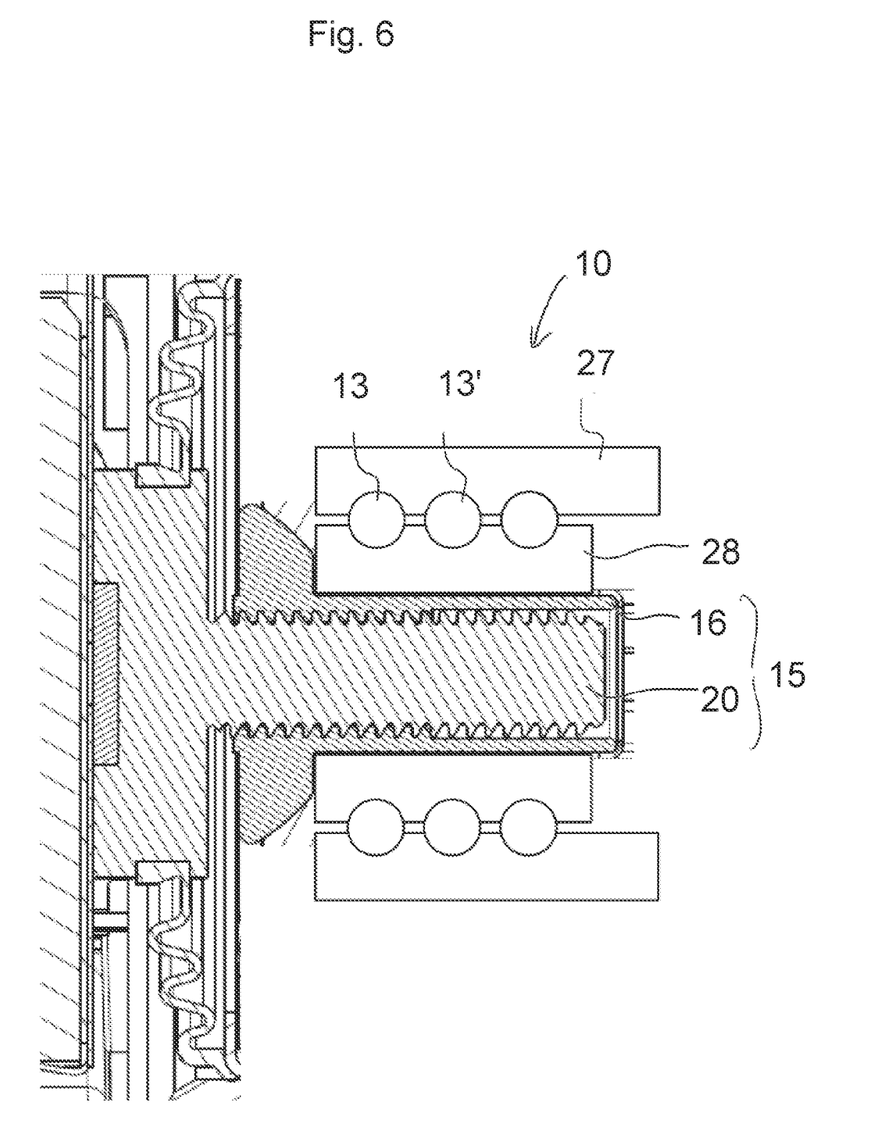
FIG. 6 shows a schematic view of a first and second gear unit according to another embodiment.

FIG. 6 shows a detailed view of a system 1' according to another embodiment. This system 1' comprises all of the features of the system 1 described above. However, the first gear unit 10 according to the embodiment shown in FIG. 6 is a ball screw. The ball screw 10 comprises a ball screw nut 27 as a first member and a ball screw shaft 28 as a second member. Further, a set of balls 13, 13' is arranged between the ball screw shaft 28 and the ball screw nut 27 to convert a rotary motion of the ball screw nut 27 into a translational motion of the ball screw shaft 28. The ball screw nut 27 and the ball screw shaft 28 are essentially of a tubular shape and are arranged such that they are concentric. The ball screw nut 27 surrounds the ball screw shaft 28 and is rotatable using the electric motor and the rotary connector 6. The rotation of the ball screw nut 27 when the brake is applied leads to a translation of the ball screw shaft 28 to the left, thereby pushing the ball screw shaft closer to the brake disk. In this case, the ball screw shaft 28 pushes against the nut 16 of the second gear unit 15 such that the second gear unit 15 moves to the left and the brake pads press against the brake disk.

Features of the different embodiments which are merely disclosed in the exemplary embodiments may be combined with one another and may also be claimed individually.

The invention claimed is:

1. A friction brake system for a vehicle, comprising:
   a first gear unit having a first member and a second member, wherein the first gear unit is configured for converting a rotary motion of the first member into a braking motion of the second member, wherein the first member is configured such that the rotary motion is configured to be driven by an electric motor; and
   a second gear unit having a spindle and nut for converting a rotary motion into a linear motion for pad wear compensation, wherein the spindle is connectable to a brake pad,
   wherein the second member of the first gear unit and the nut of the second gear unit are mechanically coupled such that, during the braking motion, the second member of the first gear unit pushes against the nut of the second gear unit to press the brake pad against a friction surface,
   wherein the first gear unit and the second gear unit are arranged such that the second gear unit penetrates the first gear unit at least partially, and
   wherein the friction brake system further comprises a hydraulic chamber and a piston arranged between the hydraulic chamber and the first gear unit and/or the second gear unit, and wherein the piston is configured to push the first gear unit and/or the second gear unit toward the friction surface upon pressurization of the hydraulic chamber to press the brake pad against the friction surface in a hydraulic fallback mode.

2. The friction brake system of claim 1, wherein the nut of the second gear unit is connected to the spindle of the second gear unit via a threaded surface of the nut, wherein the threaded surface of the nut has an axial overlap with the first gear unit.

3. The friction brake system of claim 1, wherein the second member of the first gear unit and the nut of the second gear unit are rotatably coupled such that the nut of the second gear unit is allowed to rotate with respect to the second member of the first gear unit during pad wear compensation.

4. The friction brake system of claim 1, wherein the first gear unit comprises at least one ball arranged and retained between the first member of the first gear unit and the second member of the first gear unit to convert a rotary motion of the first member into the braking motion of the second member.

5. The friction brake system of claim 4, wherein the ball of the first gear unit has an axial overlap with the second gear unit.

6. The friction brake system of claim 4, wherein the first gear unit is a ball in ramp gear, wherein the first member is a first plate with at least one groove, the second member is a second plate with at least one groove facing the groove of the first plate, wherein the at least one ball is arranged between the first plate and the second plate, wherein the ball is retained by the groove of the first plate and the groove of the second plate, wherein the ball in ramp gear is configured to convert a rotary motion of the first plate into a translational motion of the second plate with respect to the first plate.

7. The friction brake system of claim 4, wherein the first gear unit is a ball screw, wherein the first member is a ball screw nut and the second member is a ball screw shaft surrounded by the ball screw nut.

8. The friction brake system of claim 1, wherein the first gear unit has a travel dependent gear ratio in such a way that a travel distance corresponding to the braking motion is longer for a given rotation angle of the rotary motion when the brake pad is further away from the friction surface as compared to when the brake pad is in contact with the friction surface.

9. The friction brake system of claim 1, wherein the first gear unit is arranged such that the second member is closer to the brake pad than the first member, in particular when the braking motion is applied by the electric motor.

10. The friction brake system of claim 1, comprising the electric motor, wherein the electric motor is mechanically coupled to the first member of the first gear unit to drive the rotary motion of the first member of the first gear unit.

11. The friction brake system of claim 1, further comprising: a brake caliper arrangement configured to press another brake pad against a surface opposite the friction surface during the braking motion.

* * * * *